United States Patent [19]

Kobayashi

[11] Patent Number: 4,810,069
[45] Date of Patent: Mar. 7, 1989

[54] COLLIMATOR OPTICAL SYSTEM FOR EFFECTING ELLIPTICAL-TO-CIRCULAR CONVERSION

[75] Inventor: Kunimitsu Kobayashi, Tokyo, Japan

[73] Assignee: Hoya Corporation, Tokyo, Japan

[21] Appl. No.: 96,502

[22] Filed: Sep. 15, 1987

[51] Int. Cl.$^4$ .......................... G02B 13/08; G02B 3/00
[52] U.S. Cl. ..................................... 350/413; 350/420; 350/433
[58] Field of Search ........................ 350/413, 420, 433

[56] References Cited

U.S. PATENT DOCUMENTS 3,667,832  6/1972  Kitano et al. ..................... 350/413
3,894,789  7/1975  Kobayashi et al. .............. 350/413 X
4,639,094  1/1987  Aono .................................. 350/413

Primary Examiner—John K. Corbin
Assistant Examiner—Scott J. Sugarman
Attorney, Agent, or Firm—Cushman, Darby & Cushman

[57] ABSTRACT

A collimator optical system for effecting elliptical-to-circular cross section is disclosed which comprises two lenses in a slab form whose refractive index distribution in one plane is such that the refractive index decreases gradually from the center outward in the direction of their thickness. The two lenses are spaced on the optical axis in such a way that the direction of refractive index distribution in one lens crossing the direction of refractive index distribution in the other lens at right angles.

2 Claims, 1 Drawing Sheet

COLLIMATOR OPTICAL SYSTEM FOR EFFECTING ELLIPTICAL-TO-CIRCULAR CONVERSION

BACKGROUND OF THE INVENTION

The present invention relates to a collimator optical system by which an elliptical beam from a light source such as a semi-conductor laser that produces a beam having different beam divergence angles in a direction perpendicular to the active layer (i.e., vertical transverse mode) and in a direction parallel to said layer (i.e., horizontal transverse mode) can be converted to a circular beam of parallel rays.

A semiconductor laser commonly used in lightwave communications is a point source of light that produces an elliptical beam having different divergence angles in a direction perpendicular to the active layer (i.e., vertical transverse mode) and in a direction parallel to said layer (i.e., horizontal transverse mode). When a lightwave signal from such semiconductor laser is collimated with a conventional lens or a rod-shaped lens having a gradient of refractive index distribution from the center outward in their radial direction, the resulting beam is composed of parallel rays having an elliptical cross section. If such a beam is coupled to an optical device such as an optical fiber, it will not be efficiently introduced into the optical fiber having a circular cross section.

A beam that is divergent in an elliptical form may be collimated into parallel rays having a circular cross section by means of an optical system composed of two semi-cylindrical lenses crossed at right angles. However, because of the relation between curvature and thickness of each semi-cylindrical lens, this optical system is inevitably complex and it is very difficult to manufacture the desired lenses. In addition, except in special cases, it is impossible to construct a feasible system using semi-cylindrical lenses that are manufactured by the same process and which have the same dimensions.

SUMMARY OF THE INVENTION

An object, therefore, of the present invention is to provide an optical system that is capable of collimating an elliptically divergent beam into parallel rays having a circular cross section and which can be manufactured with a simple design and by a simple machining process.

The present inventors have found that the above-stated object can be attained by using two lenses in a slab form (hereinafter referred to as slab lenses) whose refractive index distribution in one plane is such that the refractive index decreases gradually from the center outward in one direction in their thickness.

DETAILED DESCRIPTION OF THE INVENTION

The essence of the present invention is a collimator optical system for effecting elliptical-to-circular conversion in which two slab lenses are combined in such a way that the direction of refractive index distribution in one slab lens crosses the direction of refractive index distribution in the other slab lens at right angles. In order to produce parallel rays of light having a circular cross section from an elliptically divergent beam by this system, it has to satisfy the following condition:

$$\tan\theta_1 \cdot \sin(g \cdot l_2) = \tan\theta_2 \cdot \sin(g \cdot l_1)$$

where $\theta_1$ is the angle of devergence of the elliptical beam in the direction of the major axis of the ellipsis, $l_1$ is the length of the slab lens used to collimate the light component having divergence in that direction, $\theta_2$ is the angle of divergence of the elliptical beam in the direction of the minor axis of the ellipsis, $l_2$ is the length of the slab lens used to collimate the light component having divergence in that direction, and $g$ is the constant of the gradient of refractive index distribution.

According to the present invention, two slab lenses having the same profile of refractive index distribution are spaced along the optical axis in such a way that the direction of refractive index distribution in one slab lens crosses the direction of refractive index distribution in the other slab lens at right angles. Because of this lens arrangement, the optical system of the present invention is capable of easily collimating an elliptically divergent beam to parallel rays of light having circular cross section, or vice versa.

Figure 1:
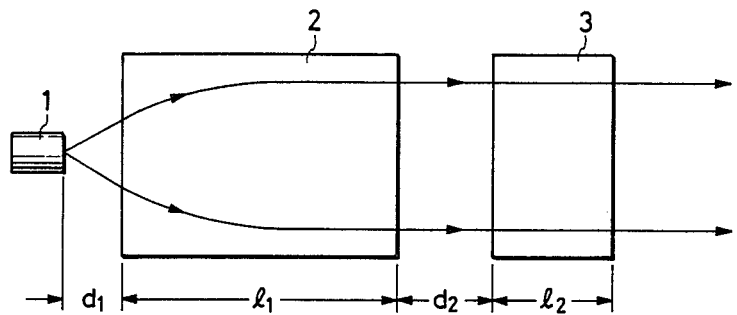
FIG. 1 is a plan view of the optical system of the present invention.
Figure 2:
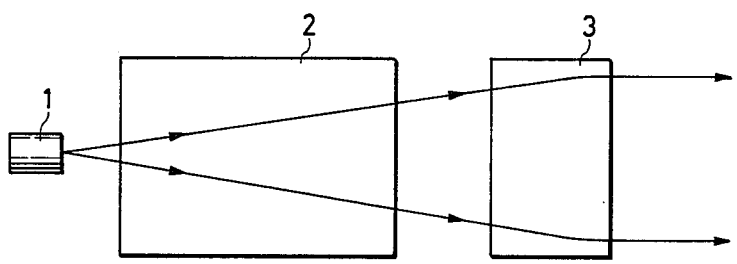
FIG. 2 is a side view of the same optical system.

An embodiment of the present invention is hereinafter described with reference to the accompanying drawings. FIG. 1 is a plan view showing how an elliptical beam that is divergent in the direction of the major axis of the ellipsis is collimated; FIG. 2 is a side view showing how an elliptical beam that is divergent in the direction of the minor axis of the ellipsis is collimated.

Figure 3:
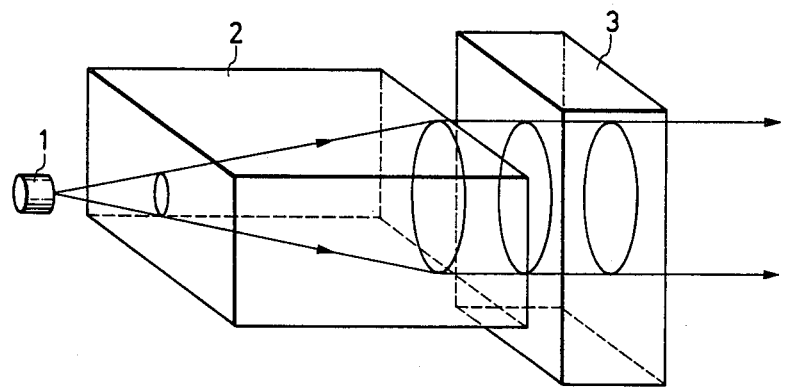
FIG. 3 is a perspective view showing the layout of the individual components of the optical system.

As shown in FIG. 3, in which the light source is indicated by 1, the optical system of the present invention comprises a slab lens 2 spaced from a slab lens 3, the two lenses being disposed on the optical axis. The slab lens 2 serves to collimate an elliptical beam having divergence in the direction of the major axis of the ellipsis and it is disposed in such a way that the direction of its refractive index distribution is parallel to the direction of the major axis of the ellipsis in which said beam is divergent. The slab lens 3 serves to collimate an elliptical beam having divergence in the direction of the minor axis of the ellipsis and it is disposed in such a way that the direction of its refractive index distribution is parallel to the direction of the major axis of the ellipsis in which said beam is divergent. According to this optical system, beams of light from the source 1 that are divergent in an elliptical form are first passed through the slab lens 2 which collimates the light component having divergence in the direction of the major axis of the ellipsis (see FIG. 1), then passes through the slab lens 3 for collimation of the light component having divergence in the direction of the minor axis of the ellipsis (see FIG. 2), with the result that parallel rays having a circular cross section emerge from the slab lens 3 (see FIG. 3).

The present inventors fabricated an optical system having the specifications indicated below, and successfully produced a beam of parallel rays having a circular cross section (dia. 2.2 mm) from the light issuing from a semiconductor laser (operating wave-length: 850 mm) that had a divergence angle of 30° in the direction of the major axis of the ellipsis and a divergence angle of 10° in the direction of the minor axis of the ellipsis:

| | |
|---|---|
| Constant of the refractive index distribution of each slab lens (g) | 0.16 (N.A. 0.3) |
| Spacing between light source and slab lens 2 ($d_1$) | 0.4 mm |
| Length of slab lens 2 ($l_1$) | 9.23 mm |
| Spacing between slab lens 2 and slab lens 3 ($d_2$) | 5.4 mm |
| Length of slab lens 3 ($l_2$) | 2.11 mm |

As described in the foregoing, the optical system of the present invention employs a pair of lenses in a slab form whose refractive index distribution in one plane is such that the refractive index decreases gradually from the center outward in one direction in their thickness. This enables an elliptically divergent beam of light to be collimated into parallel rays having circular cross section, which is not possible to accomplish with conventional lenses or a lens having a rod-shaped refractive index distribution. The present invention attains the intended object without using a complex and difficult-to-manufacture optical system such as the one in which semi-cylindrical lenses are crossed at right angles. The slab lenses employed in the optical system of the present invention can be fabricated from an optical material having the same refractive index distribution, provided that two slab lenses having different lengths are combined to satisfy the spatial relationship specified hereinabove. In short, the optical system of the present invention features great ease in system design, manufacture of lenses and other hardware, and adjustment of the optical axis. It should be noted that the optical system of the present invention can also be used for the purpose of producing parallel rays of light having an elliptical cross section of any dimensions.

I claim:

1. A collimator optical system for effecting elliptical-to-circular conversion that comprises two slab lenses each having the same refractive index distribution, said refractive index distribution in one plane being such that the refractive index decreases gradually from the center outward in the direction of the thickness of each lens, said two lenses being spaced on the optical axis in such a way that the direction of refractive index distribution in one lens crosses the direction of refractive index distribution in the other lens at right angles.

2. A collimator optical system according to claim 1 wherein said lenses in a slab form are arranged in a way that satisfies the following equation:

$$\tan\theta_1 \cdot \sin(g \cdot l_2) = \tan\theta_2 \cdot \sin(g \cdot l_1)$$

where $\theta_1$ is the angle of divergence of an elliptical beam from a light source as taken in the direction of the major axis of the ellipsis, $l_1$ is the length of the slab lens used to collimate the light component having divergence in that direction, $\theta_2$ is the angle of divergence of the elliptical beam in the direction of the minor axis of the ellipsis, $l_2$ is the length of the slab lens used to collimate the light component having divergence in that direction, and g is the constant of the gradient of refractive index distribution.

* * * * *